United States Patent
Kilicci et al.

(10) Patent No.: US 6,236,201 B1
(45) Date of Patent: May 22, 2001

(54) MAGNETIC HEAD AND DISK TESTER WITH PITCH CORRECTION

(75) Inventors: Cem Kilicci, San Francisco; Nahum Guzik, Palo Alto; Ufuk Karaaslan, Sunnyvale, all of CA (US)

(73) Assignee: Guzik Technical Enterprises, San Jose, CA (US)

( * ) Notice: Subject to any disclaimer, the term of this patent is extended or adjusted under 35 U.S.C. 154(b) by 0 days.

(21) Appl. No.: 09/241,512

(22) Filed: Feb. 1, 1999

(51) Int. Cl.$^7$ .................................................. G01R 33/12
(52) U.S. Cl. ......................... 324/212; 318/652; 324/210
(58) Field of Search ................................. 324/212, 260, 324/210; 318/652, 560, 565, 593, 626, 671, 685; 209/573; 360/31, 105, 106

(56) References Cited

U.S. PATENT DOCUMENTS

| | | | |
|---|---|---|---|
| 5,382,887 | * | 1/1995 | Guzik et al. .......................... 318/652 |
| 5,903,085 | * | 5/1999 | Karam .................................. 310/328 |
| 6,006,614 | * | 12/1999 | Guzik et al. ......................... 73/865.6 |

* cited by examiner

Primary Examiner—Walter E. Snow
Assistant Examiner—Amber C. Knox

(74) Attorney, Agent, or Firm—McDermott, Will & Emery

(57) ABSTRACT

A magnetic head and disk tester provides accurate positioning of a magnetic read-write head over a magnetic disk by means of a coarse positioning mechanism and a fine positioning mechanism. The coarse positioning mechanism includes a stepper motor, a lead screw, a nut, rear sliders and a housing. The fine positioning mechanism includes a piezoelectric actuator, slides and a carriage. The positioning displacements are along a linear axis, which lies on a horizontal plane. The carriage is connected to the housing via the fine positioning mechanism, which then moves the carriage with respect to the housing. Two pairs of linear encoders are mounted on the carriage about the axis and measure the position of the magnetic read-write head with respect to the magnetic disk. Each pair is mounted such that the pairs lie in separate horizontal planes. One linear encoder on each pair is mounted to the right of the magnetic read-write head and the other to the left of it, the magnetic read-write head being equal distances from the two linear encoders of each pair. The magnetic read-write head is mounted on the carriage with an offset from each pair of linear encoders in the vertical direction. Pitch during the fine positioning movement causes the head to move a different amount than that measured by any one of the pairs of linear encoders. By using both pairs of encoders, the amount of pitch is determined. A feedback circuit responsive to that determination causes the fine positioned to move the head to the correct pitch.

20 Claims, 9 Drawing Sheets

MAGNETIC HEAD AND DISK TESTER WITH PITCH CORRECTION

REFERENCE TO RELATED APPLICATION

This application is related to U.S. patent application Ser. No. 09/241510, entitled Magnetic Head and Disk Tester with Yaw Correction, filed on even date herewith, and assigned to the assignee of the present invention. That application is incorporated herein by reference.

BACKGROUND OF THE INVENTION

The present invention relates to magnetic head and disk testers, and in particular, to a method and apparatus for improving the accuracy of the mechanisms that position a magnetic head with respect to a magnetic disk in a magnetic head and disk tester.

A magnetic head and disk tester is an instrument that is used for testing characteristics, such as signal-to-noise ratio, track-to-track error, of magnetic heads and disks. In some cases, a disk (e.g., a computer hard drive disk) may be tested with a known and calibrated head and in other cases a magnetic head may be tested with a calibrated disk. A magnetic disk and head tester consists of two main portions, a mechanical portion that performs movements of the head with respect to a disk supported by the tester, and an electronic portion that is responsible for measurement, calculation, and analysis of data. The mechanical portion of the tester is known as a spinstand. The quality of the results of tests performed using such a magnetic head and disk tester depends at least in part upon the positioning accuracy provided by the spinstand for the head with respect to the disk.

A typical magnetic head and disk tester of the prior art is shown schematically in FIGS. 1 and 2, and is described in U.S. Pat. No. 5,382,887 to Guzik, et al. In the description below, spinstands are described in which a carriage (and attached head) is selectively moved along an axis in a horizontal plane, where the head is moved with respect to a horizontally supported disk, rotatable about a vertical axis. While these vertical and horizontal reference directions are used in the exemplary spinstands, other orientations may be used in other embodiments.

The illustrated spinstand 10 includes a base 50 having a disk spindle 46 extending vertically (as illustrated) therefrom. The spindle 46 supports a disk 42 in a horizontal (as illustrated) plane, in a manner permitting controlled rotation of the disk about a vertical axis.

A carriage 30 is slidably supported on a plurality of rails 22, 24 which are rigidly mounted to a base 50, whereby carriage movement can occur along a horizontal axis (X-axis). A head support element 44 is secured to carriage 30 and includes a magnetic read-write head 40 mounted at its distal end. A drive assembly includes (1) a coarse positioner, for effecting gross motion of the carriage 30 along rails 22, 24, and (2) a fine positioner, for effecting minor motions of the carriage 30. The movement of carriage 30 results in a corresponding movement of the magnetic head 40 to desired positions over a magnetic disk 42. The magnetic head 40 is moveable in a radial direction relative to the disk 42, such movement facilitating testing of a disk or a head.

In this prior art systems, the linear position of the carriage 30 relative to base 50 and thus the relative position of the magnetic read-write head 40 to the disk 42, is measured using two linear encoders 12 and 14 that are symmetrically mounted to the carriage 30 on opposite sides of the X-axis. That is, a first encoder 12 is mounted on a right lateral side of the carriage 30 and a second encoder 14 is mounted on a left lateral side of the carriage 30. Outputs of each encoder 12 and 14 are supplied to an arithmetic unit 52 which determines the position of the magnetic read-write head 40 using these outputs. Each encoder is substantially comprised of two parts. One part is secured to the base 50, and so is stationary. The other part is affixed to carriage 30, and so is moveable relative to the stationary part of the encoder. The measurement of the relative movement of the moveable part of the encoder with respect to the stationary part of the encoder is used to determine the movement and position of the head 40 relative to the disk 42.

The coarse positioner of the spinstand includes a stepper motor 32 affixed to base 50, a lead screw 34, a nut 36 on the lead screw 34 and a block 38 which is mounted on rails 26 and 28. The nut 36 is attached to the block 38. The lead screw 34 and nut 36 are used to transfer the rotary movement of the stepper motor 32 to linear movement of the block 38 on rails 26, 28 along X-axis.

The fine positioner of the prior art spinstand 10 includes carriage 30 which is mounted on rails 22 and 24 and moves along the X-axis, and a piezoelectric actuator 48. The piezoelectric actuator 48 is mounted between the block 38 and the carriage 30. The actuator 48 is responsive to voltages applied thereto, to change its dimension in the x-direction, direction, which in turn results in displacement of the carriage 30 with respect to block 38.

In operation, the coarse positioner is able to move the carriage 30 over relatively long distances, but remains limited in linear resolution to the degree that it cannot position the magnetic read-write head 40 with the accuracy required to adequately test current heads and disks. The magnetic recording technology today requires spinstands that can position the magnetic read-write head 40 with an accuracy of about 10 nm or better, thus the need for the fme positioner. The piezoelectric actuator 48 has a much shorter movement range than the coarse positioner, and can position the carriage 30 with the required accuracy of 10 nm. A typical piezoelectric actuator 48 would be PZT-5H produced by Morgan Matroc Inc., Ohio, U.S.A. This unit has a 15 micrometer range and is able to create movement with steps shorter than 10 nm.

The prior art methods used to test the magnetic read-write heads and disks include positioning the magnetic read-write head 40 a number of times with very small displacements that require the accuracy of the fine positioner. These small movements require extreme accuracy in the fine positioner. During these movements, it is common, for the magnetic read-write head 40 to be moved from a predetermined position to a new position, and then return to the first position. A signal read by the magnetic read-write head 40 can reveal any mismatch between the intended position, and the actual position of the magnetic-read-write head 40. The difference in position due to this forward and backward movement of the carriage 30 is called "mechanical hysteresis" and it is possible to detect this hysteresis by measuring the amplitude of the signal read by the magnetic read-write head 40.

There are many causes for mechanical hysteresis, and two of the most common ones in a spinstand are the yaw and pitch of the carriage 30. The term "yaw" refers to angular motion of the carriage 30 about a vertical axis. The term "pitch" refers to angular motion of the carriage 30 about a horizontal axis which is perpendicular to the x-axis.

The position of the carriage 30 is measured using the linear encoders 12, 14 during each coarse and fine positioning movement. In an ideal case, the linear encoders are mounted in close proximity to the magnetic read-write head 40, and therefore would measure its actual position. In reality, due to mechanical, limitations, it is often not possible to position the linear encoders this way. Rather, the encoders are mounted away from the head. This orientation leads to errors in the measurement of the position of the head, due to the pitch and yaw motions of the carriage. Therefore, a plurality of linear encoders need to be used to best determine the actual position of the head. In U.S. Pat. No. 5,382,887, granted Jan. 17, 1995, and assigned to the assignee of the present invention, the yaw motion of a carriage (and attached head) is detected by placing a linear encoder 12 and 14 on each side of the carriage, parallel to the direction of the movement of the carriage and symmetrically with respect to the center line (X-axis) of the carriage. Using the difference in the readout of the two linear encoders 12 and 14, the amount of yaw that occurs during the positioning movements can be determined. However, there is no current method or apparatus for determining the amount of, and accommodating, pitch of the carriage 30.

SUMMARY OF THE INVENTION

The present invention provides a magnetic head and disk tester with improved accuracy in the positioning of the head relative to the disk. Pitch of the head relative to the disk is detected and corrected. The magnetic head and disk tester accomplishes linear positioning of a magnetic read-write head, which is secured to a slidable carriage, over a magnetic disk by means of a coarse positioning mechanism and a fine positioning mechanism. In a preferred form, which is similar to the above described prior art spinstand, the coarse positioning mechanism includes a stepper motor, a lead screw, a nut, sliders and an intermediate block. The fine positioning mechanism includes a piezoelectric actuator, slides, and the carriage. The linear positioning displacements experienced by the carriage and, therefore, the head are along a principal axis, which is preferably horizontal. However, positioning of the carriage may cause the carriage to tend to pitch (i.e. tilt about a horizontal axis which is perpendicular to the principal axis), which nominally results in linear positioning errors of the magnetic read-write head.

In a preferred embodiment of the present invention, the carriage is connected to the intermediate block via a piezoelectric actuator assembly, which moves the carriage along the slides and along a horizontal carriage axis, or X-axis. Two pairs of linear encoders are mounted on the carriage about the X-axis and measure the position of the magnetic read-write write head with respect to the magnetic disk. Each encoder pair is mounted such that the pairs lie in separate horizontal planes. One linear encoder on each pair is mounted to the right of the magnetic read-write head and the other to the left of it, the magnetic read-write head being equidistant from the two linear encoders of each pair. The magnetic read-write head is mounted on the carriage with an offset from each pair of linear encoders in the vertical direction. Pitch of the carriage during the fine positioning movement may cause the head to tilt away from its normal position (which is a fixed orientation with respect to a vertical axis) about a horizontal pitch (Z) axis which is orthogonal to the X axis. The vertically offset pairs of encoders determine the amount of pitch and a feedback circuit causes the fine positioner to move the head to the correct predetermined position, thereby eliminating the pitch.

In one form of the present invention, two independent vertically offset piezoelectric actuators are used to accomplish fine positioning of the carriage and read-write magnetic head. Different displacements are generated by the vertically offset piezoelectric actuators, to eliminate the pitch of the carriage and, thereby, correct the pitch induced linear displacement error of the magnetic read-write head.

In another embodiment of the present invention, two independent piezoelectric actuators may also be used with a first actuator being operative along the X axis (as in the above described prior art spinstand), and with a second actuator arranged to effect displacement of the carriage along a vertical axis. The latter actuator can be positioned along a vertical axis between an L-shaped mount extending from the intermediate block, to the carriage. Accordingly, the second actuator causes a force to be applied to the top surface of the carriage, via the arm, and thereby corrects the pitch of the carriage.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Figure 1:
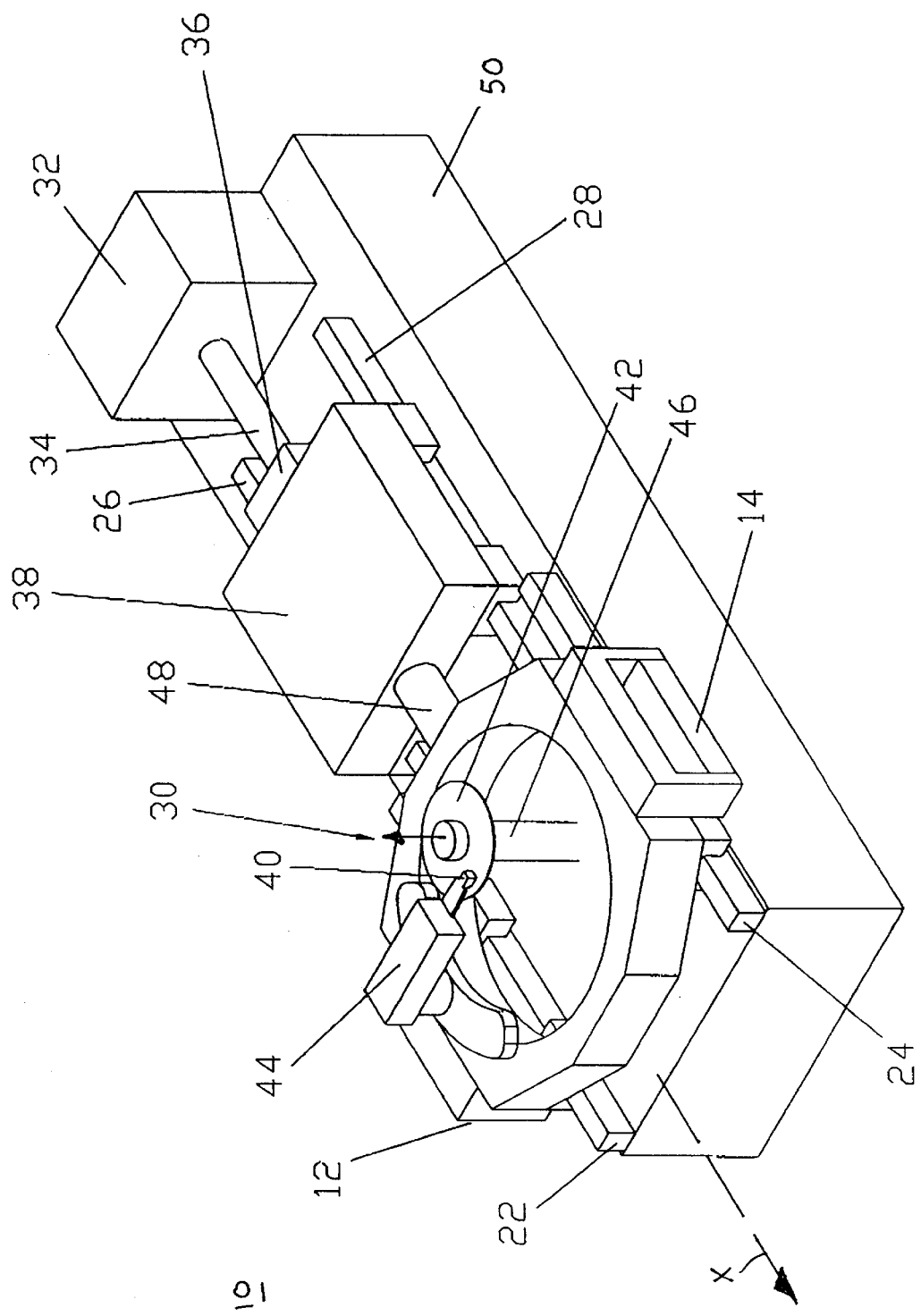
FIG. 1 is a schematic perspective view of a prior art magnetic head and disk tester.

The present invention is an improved method and apparatus for positioning a magnetic head with respect to a magnetic disk, within a magnetic head and disk tester. The invention provides for correction of pitch experienced by the magnetic head relative to the disk due, for example, to forces applied to the head from typical movements thereof. The invention is described with respect to several figures. When a referenced item appears unchanged in several figures, that item retains the same reference numeral.

Figure 3:
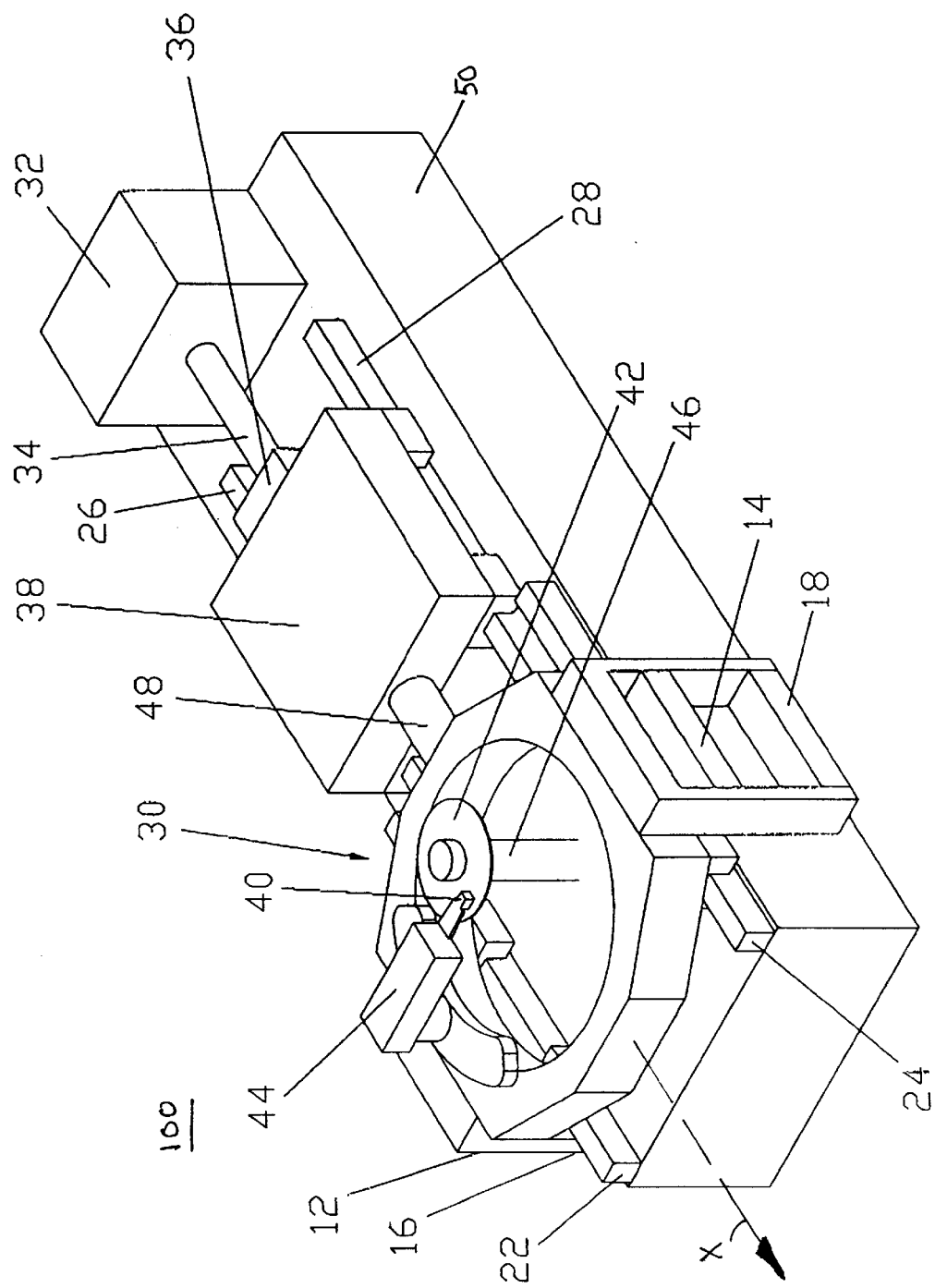
FIG. 3 is a schematic perspective view of a tester of the invention.

FIG. 3 shows a schematic perspective view of a first embodiment of a magnetic head and disk tester 100 according to the present invention. The tester 100 of FIG. 3 includes elongated base 50 having a pair of forward rails 22 and 24 and rear rails 26 and 28, each extending in the direction of a horizontal (X) axis. A carriage 30 is slidable along forward rails 22, 24, and an intermediate block 38 is slidable along rear rails 26, 28. A head support element 44 is secured to a carriage 30. A magnetic read-write head 40 is mounted to the head support element 44 at its distal end. A stepper motor 32 fixed to base 50 rotationally drives a lead screw 34 which is coupled to drive nut on block 38 for coarse positioning of the carriage 30 and magnetic read-write head 40. A piezoelectric actuator 48 is positioned between block 38 and carriage 30 for fine positioning of carriage 30 relative to block 38. While the carriage of the preferred embodiments is described as being slidable along two forward rails, those skilled in the art will appreciate that the displacement of the carriage along the X-axis may be accomplished in a variety of manners, without departing from the present invention. For example, the carriage could slide along a single keyed center rail or more than two rails. Alternatively, the carriage could roll on rollers, wheels, bearings, or some combination thereof. And, the coarse positioner could employ any of a variety of mechanisms to displace the carriage along the X-axis, such as motor driven pulleys, belts, or gears, for example.

In the first embodiment, a first pair of numerical output linear encoders, 12 and 14, is installed on carriage 30 such that each encoder is oriented to be opposite the other, symmetric about the X-axis, and, therefore, parallel to the direction of movement of carriage 30 relative to base 50. A second pair of numerical output linear encoders, 16 and 18, is installed on carriage 30 and similarly disposed about the X-axis as are encoders 12 and 14, except encoders 16 and 18 are displaced at a fixed vertical distance from and parallel to encoders 12 and 14, respectively.

Encoders 12, 14, 16 and 18 are installed on the sides of the carriage 30 because they are more accessible in these positions, and because it is difficult, inconvenient, and in some cases physically impossible to install a linear encoder at the point of interest, i.e., exactly at the read-write head element of magnetic read-write head 40. However, those skilled in the art will appreciate that the encoder pairs could be oriented differently without departing from the present invention. For example, the vertical heights of the encoder pairs could be manipulated, and one encoder pair could be made to be co-planar with the magnetic head. In the preferred embodiments, the linear encoders are model LIF 101 R, manufactured by Heidenhain Corporation, Schaumburg, Ill. These encoders can measure displacements of the carriage with a resolution of 1 nm. Other types of encoders having similar accuracies could also be used, such as electrical, mechanical, magnetic, or some combination of the various types of encoders.

Linear encoders 12 and 14 measure linear displacement of carriage 30 in a first horizontal plane, and linear encoders 16 and 18 measure linear displacement of carriage 30 in a second horizontal plane. In the illustrated embodiment, encoders 12 and 14 are symmetrically oriented about the X-axis to measure the differences in linear displacement of each side of the carriage 30. That is, the magnetic read-write head 40 is mounted between linear encoders 12 and 14, although vertically displaced from the encoders, and at equal distances from them, in the preferred embodiments. By taking the measurements of linear encoders 12 and 14, and taking the arithmetic average of these measurements, the errors in the position of the magnetic head due to yaw can be mathematically eliminated, and a single displacement value S1 that corresponds to the displacement of encoders 12 and 14 from a known point in the first horizontal plane can be obtained. The same can be done for linear encoders 16 and 18, and another displacement value S2 from a known point in the second horizontal plane can be obtained for their respective movements. Alternatively, instead of averaging the pairs of position signals the error in position of each side can be determined separately for using the position signals generated by each encoder of encoder pairs 12, 14 and 16,18, and the results can be averaged for each pair, with latter values being used to correct yaw.

Figure 4:
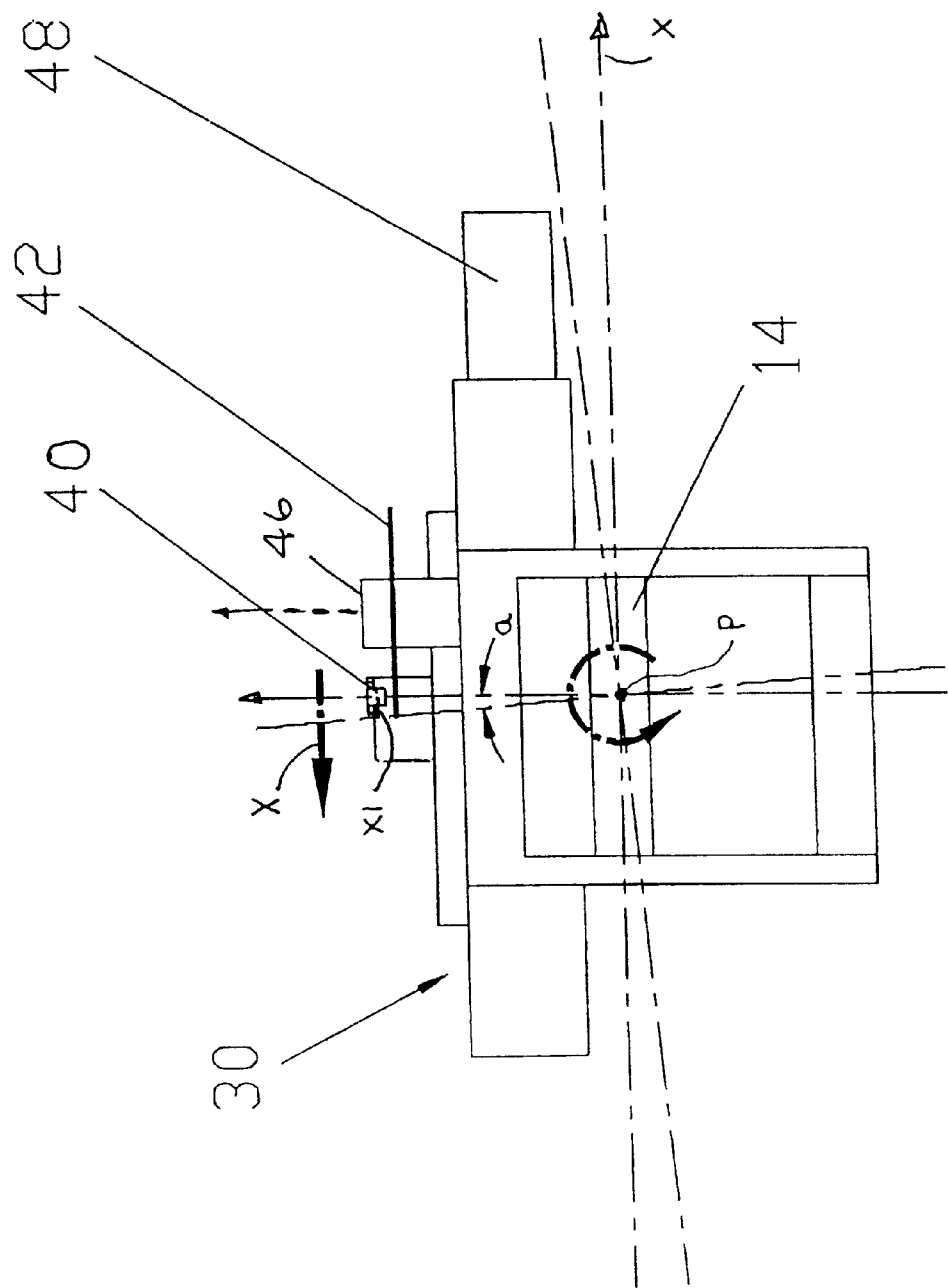
FIG. 4 is a schematic cutout side view of the tester showing carriage 30 and its pitch movement.

FIG. 4 illustrates an examplary pitch carriage 30 and, consequently, head 40 with respect to disk 42, (which is horizontally supported by spindle 46). A "contact point" of magnetic head 40, which is the portion of the magnetic head in closest proximity to disk 42 during testing, nominally (i.e., without pitch) lies along a vertical head axis (or "Y-axis"), which is orthogonal to the X-axis. In FIG. 4, carriage 30 is tilted (by an angle "a") about a pitch axis (or "Z-axis") which is orthogonal to both of the X-axis and Y-axis, resulting in a displacement of head 40 by a displacement X1 from the Y axis.

Figure 5:
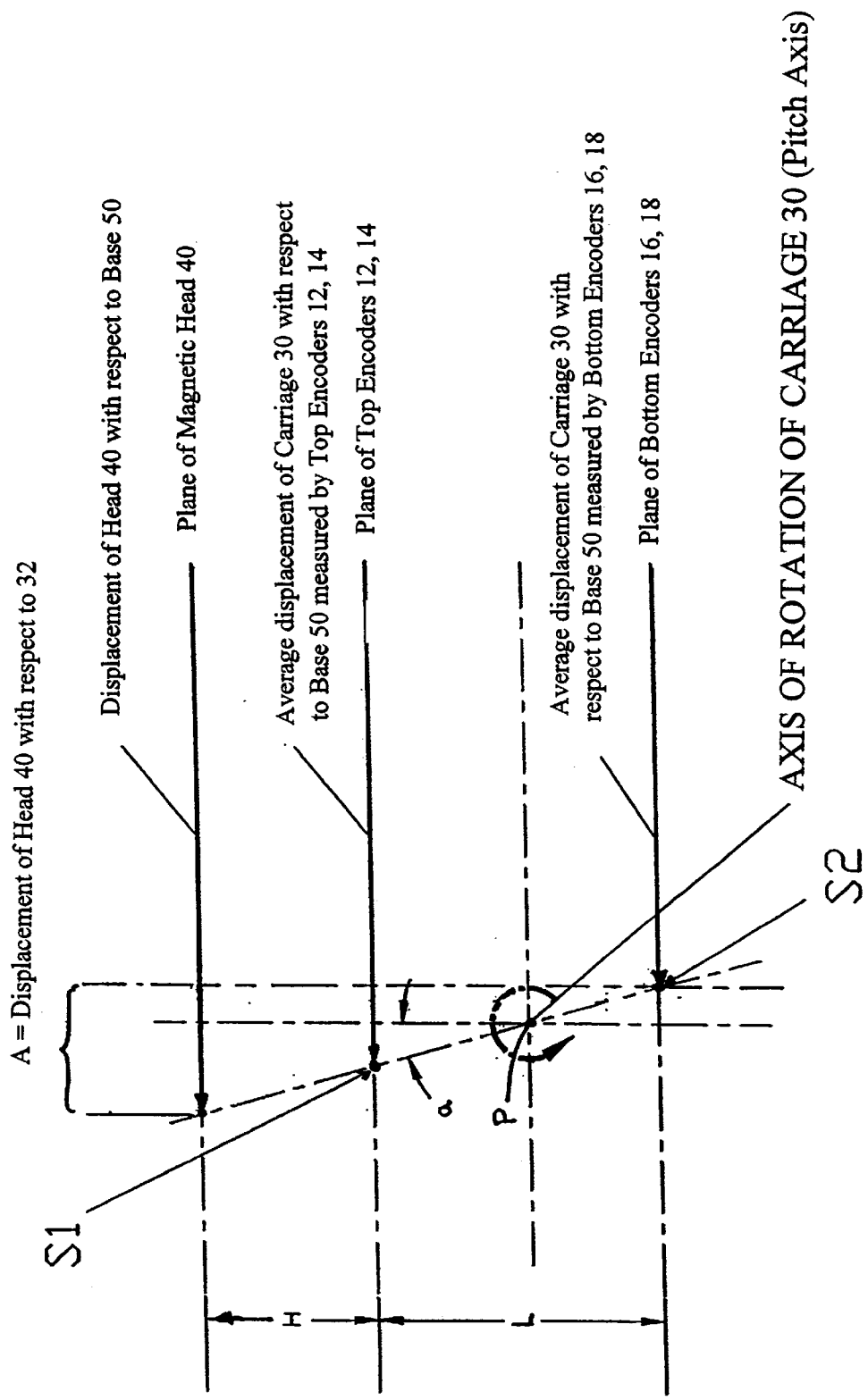
FIG. 5 is a schematic diagram showing the displacement of the magnetic read-write head with respect to the linear encoders.

As shown in FIG. 5, the position of the magnetic read-write head 40 with respect to a reference on the base 50 includes two error components, one due to a horizontal displacement error of the carriage 30 along forward rails 22 and 24 and the other due to the pitching (rotational) movement of carriage 30 about the Z-axis. The pitch component, due to its angular nature, corresponds to two types of movement of the magnetic read-write head 40, one being along the vertical Y-axis, the other (X1) being along the horizontal X-axis. Due to the lack of need for precision in the 25nm range in the vertical Y-axis, the vertical movement caused by the pitch of the carriage 30 may be ignored for the present embodiment. The horizontal X-axis component X1 is of importance. When the carriage 30 has a pitch in the amount of angle α, the total displacement A of the magnetic head 40 can be determined. The relationship between angle α and the horizontal displacement of head 40 can be formulated with the following equations, wherein:

P: point of rotation (Z axis) around which the pitch takes place.

S1; average displacement of carriage 30 with respect to base 50 in the horizontal plane of detectors 12, 14 as measured by linear encoders 12 and 14.

S2: average displacement of carriage 30 with respect to base 50 in the horizontal plane of detectors 16, 18 as measured by linear encoders 16 and 18.

A=the horizontal displacement of the magnetic read-write head 40 (due to pitch a) measured from S2.

H=vertical distance between the head 40 and the horizontal plane of linear encoders 12 and 14.

L=vertical distance between the horizontal planes of the respective linear encoder pairs 12, 14 and 12, 18.

The tangent of pitch angle α may be expressed as follows:

$$\tan a = A/(H+L)$$

$$\tan a = (S1-S2)/L$$

Consequently, $$A=(S1-S2)*(H+L)/L;$$

Therefore, the position of the magnetic read-write head 40, in the horizontal direction is given by:

$$(A+S2)=S1*(H+L)/L-S2*H/L$$

Figure 2:
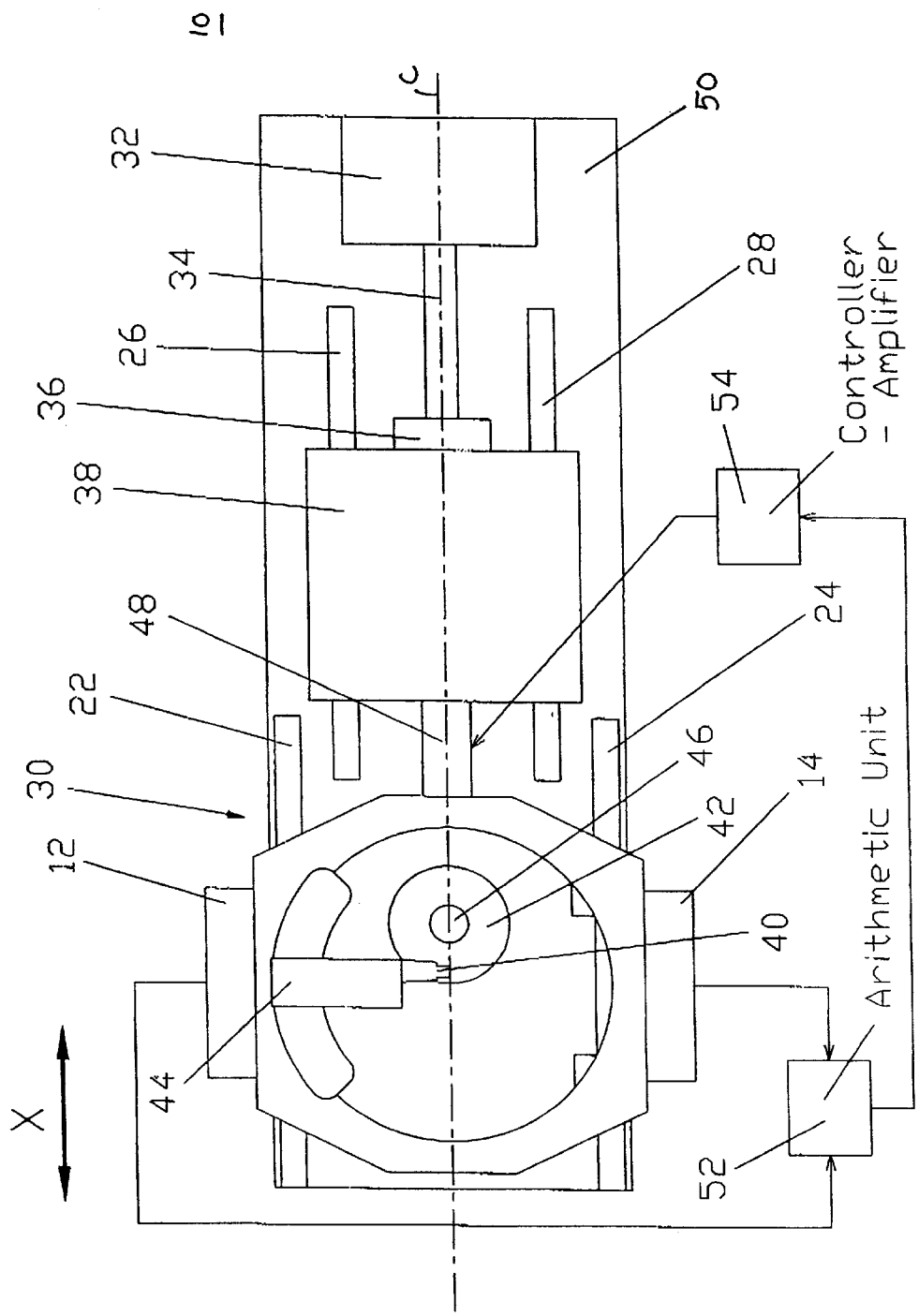
FIG. 2 is a schematic top view of the magnetic head and disk tester of FIG. 1.

A signal representative of the position of the magnetic read-write head 40 (=A+S2) is then passed to the controller-amplifier 54, and the head 40 is then moved using a feedback circuit to bring it to the predetermined position, as described with respect to FIG. 2.

Figure 6:
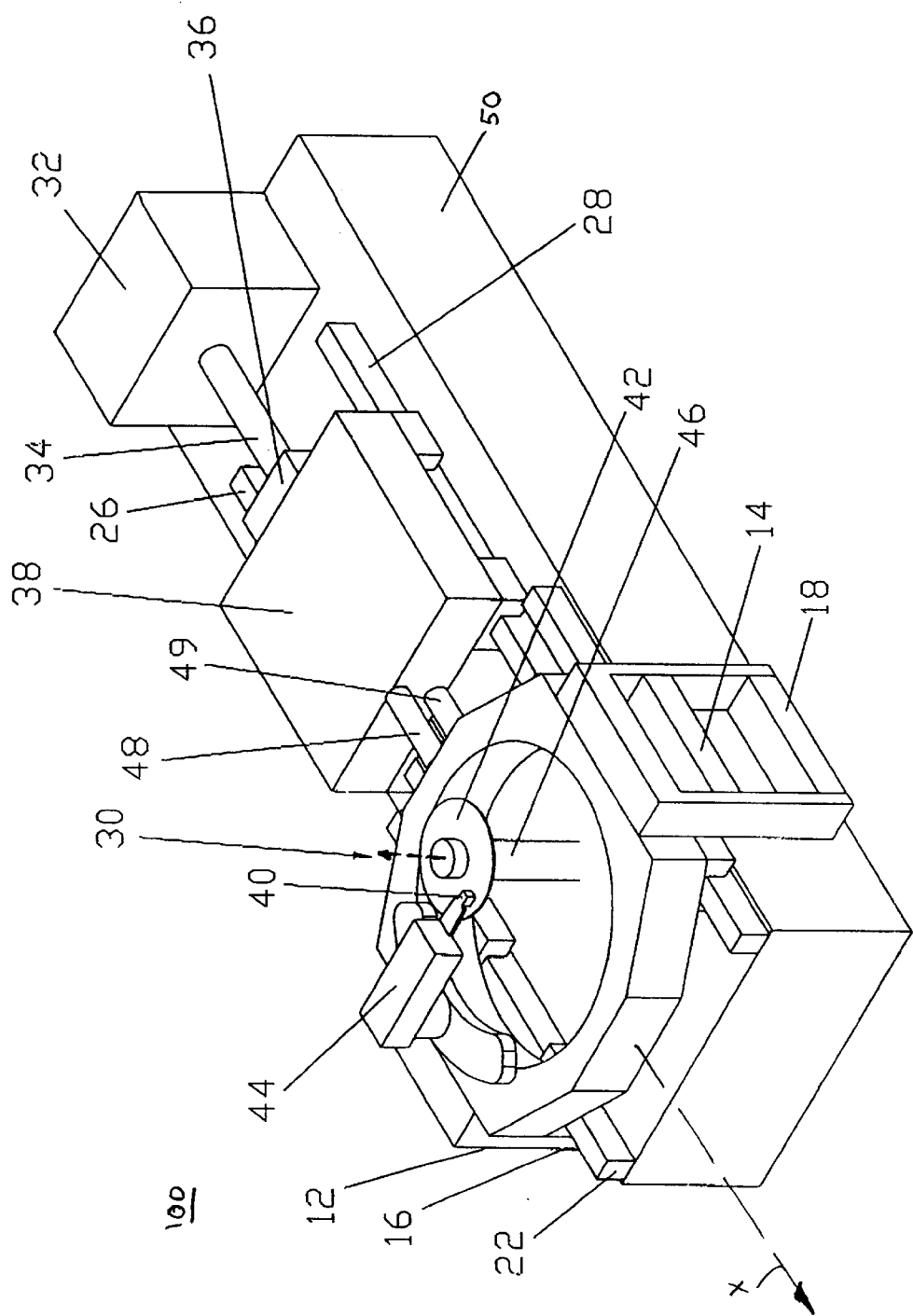
FIG. 6 is a schematic perspective view of the invention showing two vertically offset piezoelectric actuators.
Figure 7:
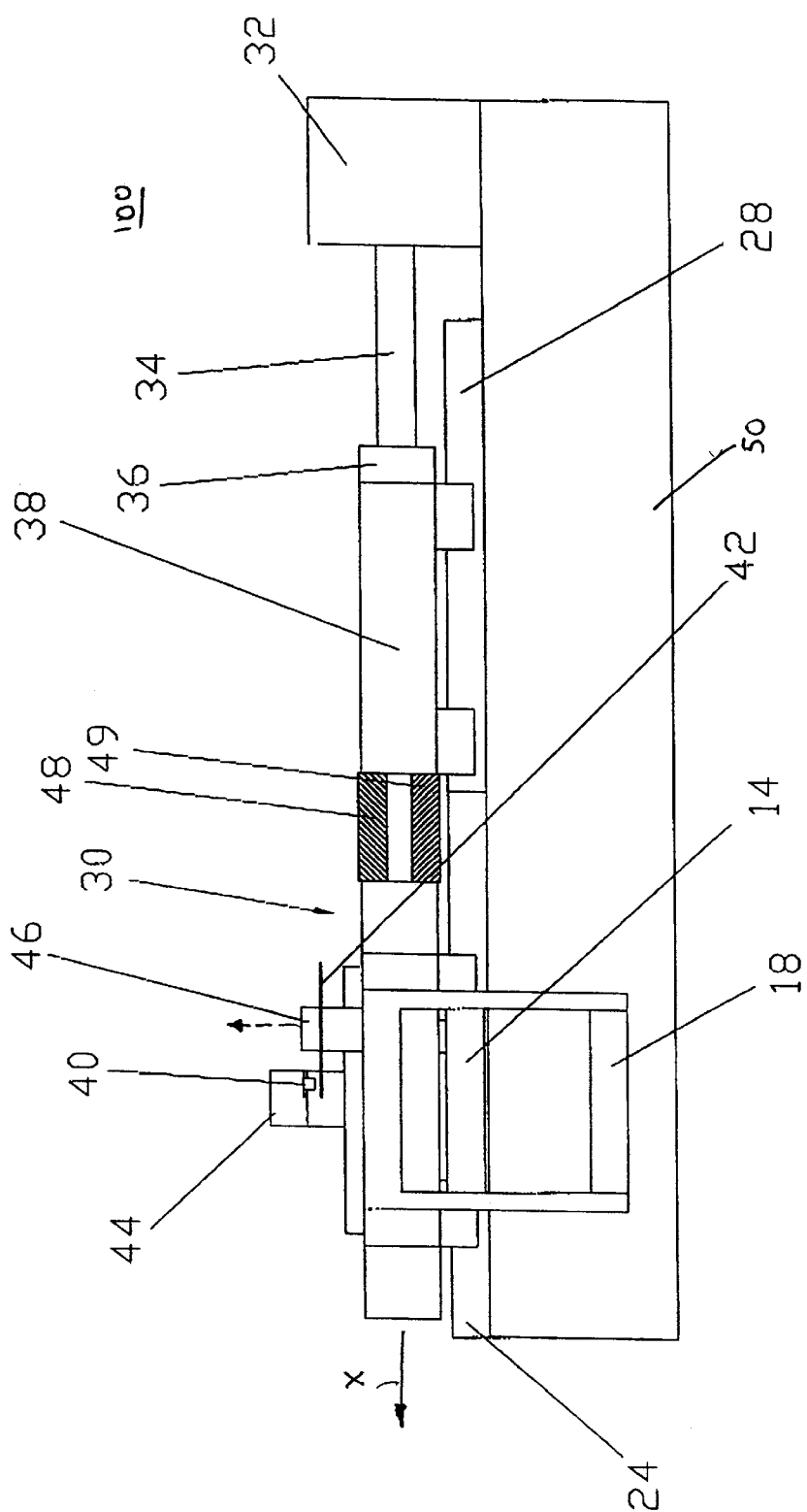
FIG. 7 is a schematic side view of the tester of FIG. 6.

A second embodiment of the present invention includes a method and apparatus for eliminating positioning errors due to pitch of carriage 30 is using two piezoelectric actuators, as shown in FIGS. 6 and 7. The two piezoelectric actuators 48 and 49 are arranged to provide displacement parallel to the X-axis and are vertically offset from each other. Fine positioning is achieved by activating the two piezoelectric actuators 48 and 49 together. By controlling the differential movement of the two piezoelectric actuators 48 and 49, the pitch of carriage 30 is controlled, or, in this case, eliminated, with the measurements S1 and S2 calculated as previously discussed and then fed back from the two pairs of linear encoders to the controller-amplifier 54. Carriage 30 is then manipulated accordingly by piezoelectric actuators 48 and 49 to adjust the position of head 40

Figure 8:
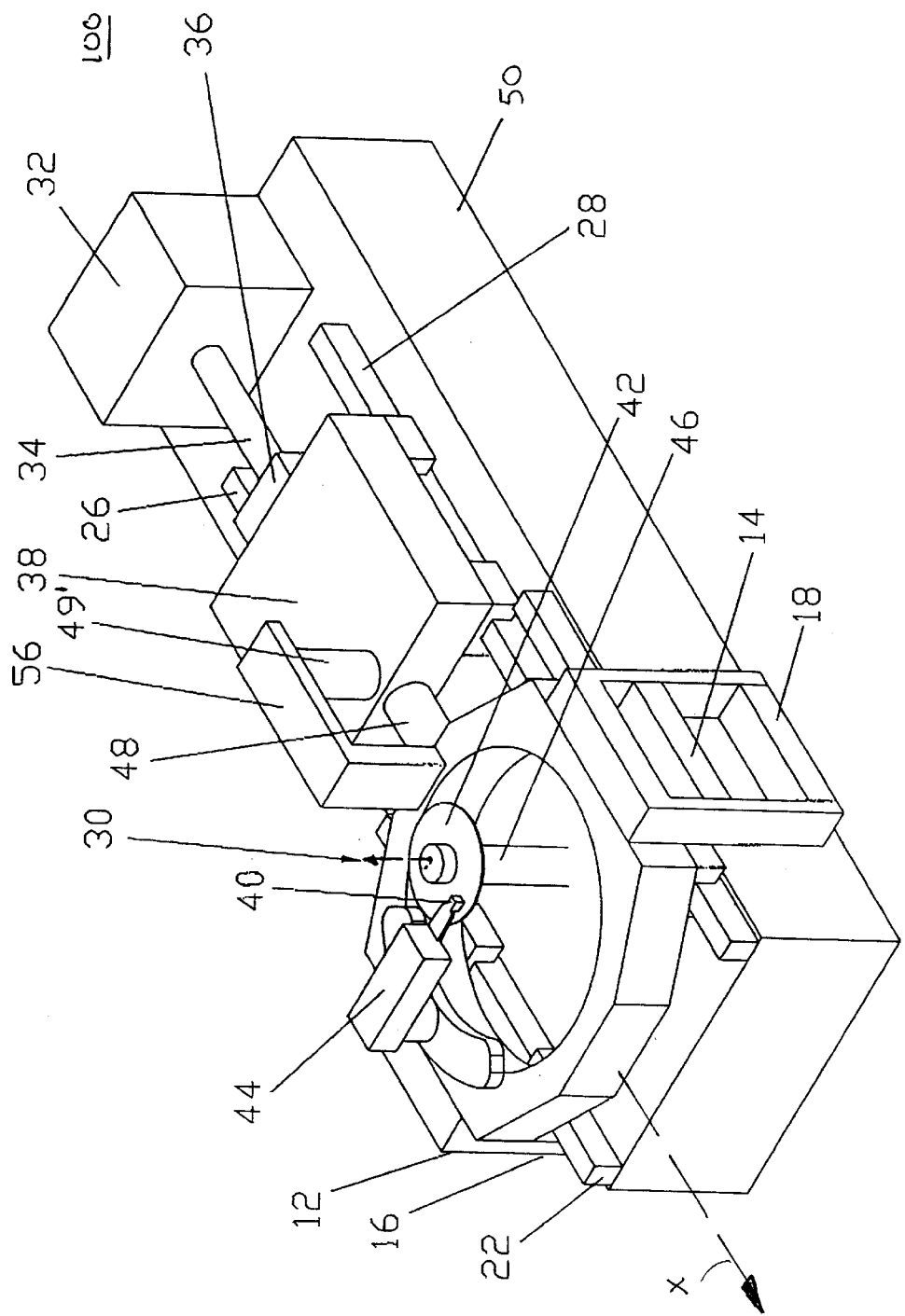
FIG. 8 is a schematic perspective view of a tester of the invention showing two piezoelectric actuators, one arranged for applying a horizontal force component, the other arranged for applying a vertical force component to carriage 30.
Figure 9:
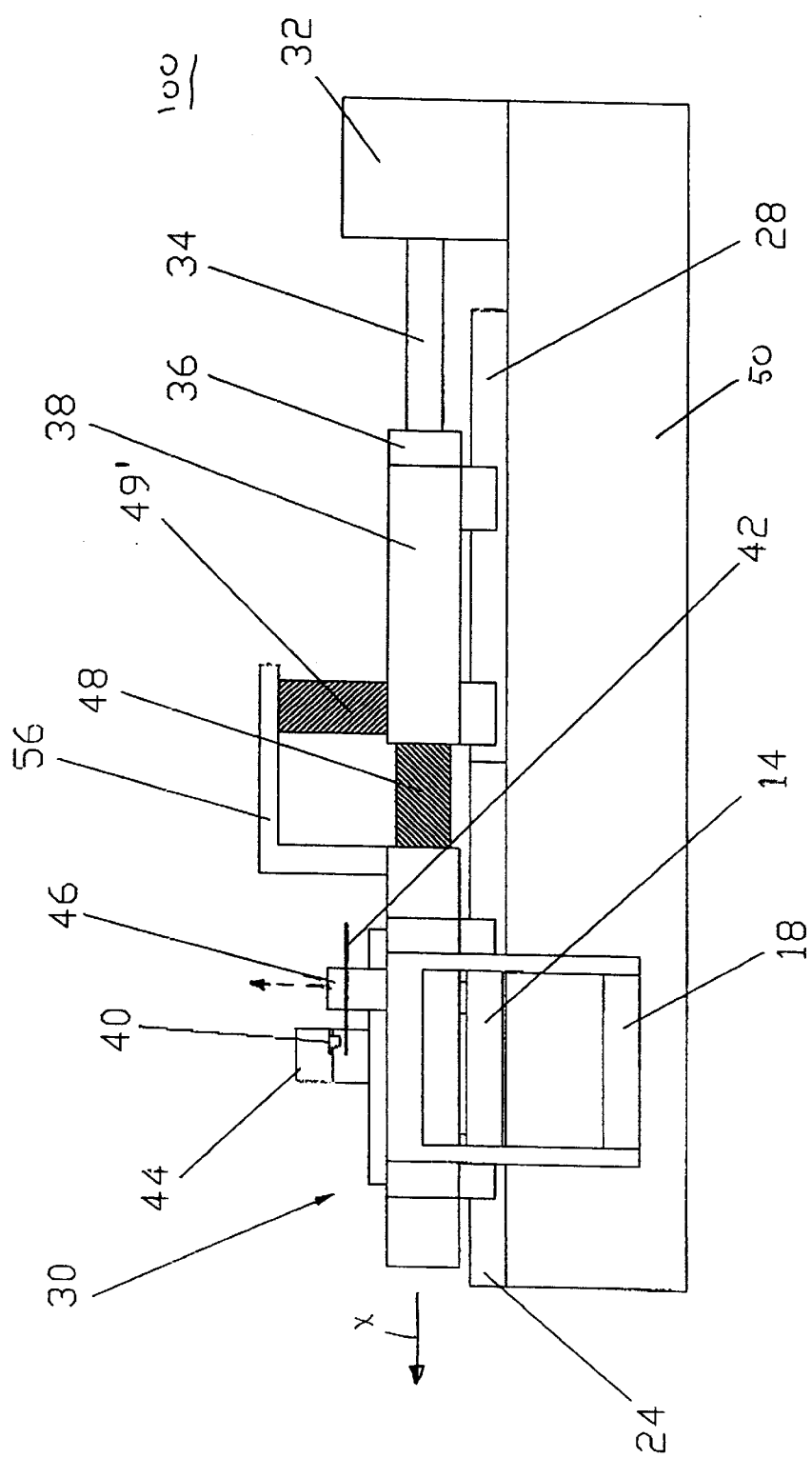
FIG. 9 is a schematic side view of the tester of FIG. 8.

A third embodiment of the present invention is shown in FIGS. 8 and 9, and includes two piezoelectric actuators 48 and 49'. Piezoelectric actuator 48 is arranged such that it controls the horizontal movement of carriage 30, as previously discussed. A second piezoelectric actuator 49' is arranged such that it controls the movement of an arm 56, and thereby the underlying portion of carriage 30, in the vertical direction. Piezoelectric actuator 49' is secured to a top portion of intermediate block 38 and extends perpendicularly upward therefrom. Arm 56 is attached to the carriage 30 at one end and to actuator 49' at its opposite end. The vertical displacement component of the pitch of carriage 30 is controlled by the vertical movement of arm 56 by piezoelectric actuator 49'. As with the other embodiments, the measurements S1 and S2 are calculated as previously discussed and then fed back from the two pairs of linear encoders to the controller-amplifier 54. Arm 56 is then manipulated accordingly to adjust the position of head 40.

The invention may be embodied in other specific forms without departing from the spirit or central characteristics thereof. For example, a head stack with many magnetic heads and a disk pack can be used instead of the single magnetic head and the single magnetic disk. In the latter case, the pitch for each head is determined separately, because the carriage pitch causes each head in a stack to be displaced with respect to its associated disk by a different amount. Additionally, rather than a dual stage positioning system, a positioning system having only one, or more than two, positioning stages could also be used, so long as at least one stage is capable of performing fine positioning. Also, it is not critical that the stage most proximate to the magnetic head perform fine positioning, but rather the last (in terms of chronological order) active stage performs fine positioning (including compensation for pitch). As another example, the coarse positioner could take a variety of forms, such as a motor driven belt (rather than screw driver) positioner, and the fine positioner need not be piezoelectric. The carriage can alternatively be placed on one or more rollers or bearings, in lieu of rails. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A magnetic head and disk tester for testing at least one magnetic head together with at least one magnetic disk, said tester comprising:
   A. a base;
   B. a spindle on said base for supporting said magnetic disk in a horizontal plane said disk being rotatable about a vertical axis;
   C. a carriage rigidly supporting said magnetic head, said carriage being slidably positionable on said base in the direction of a horizontal reference axis;
   D. means for driving said carriage along said reference axis;
   E. a first measurement means attached to said carriage for generating a first signal representative of the displacement of a first portion of said carriage relative to said base in the said direction of reference axis;
   F. a second measurement means attached to said carriage for generating a second signal representative of the displacement of a second portion of said carriage relative to said base in the direction of said reference axis, wherein said first portion of said carriage is vertically displaced from said second portion of said carriage; and
   G. means responsive to said first signal and said second signal for positioning said head along said reference axis whereby pitch of said carriage is substantially offset.

2. The magnetic head and disk tester of claim 1 wherein said drive means includes a first driver for coarse positioning of the magnetic head at the vicinity of a predetermined position, and a second drive means for fine positioning of the magnetic head at the predetermined position.

3. The magnetic head and disk tester of claim 2 wherein the first drive means comprises a stepper motor affixed to said base, a lead screw rotatable by said stepper motor, and a nut fixed to an intermediate block, and wherein the said second drive means comprises a piezoelectric actuator mounted between said intermediate block and said carriage.

4. The magnetic head and disk tester of claim 1 wherein the first measurement means and the second measurement means each include one pair of optical linear encoders, wherein said pair of said first measurement means is disposed in a first horizontal plane, and said pair of said second measurement means is disposed in a second horizontal plane vertically offset from said first horizontal plane.

5. The magnetic head and disk tester of claim 1 wherein an arithmetic unit is used to calculate the position of the magnetic head using the information from the first measurement means and the second measurement means.

6. The magnetic head and disk tester of claim 1 wherein a controller-amplifier unit is used to command the first drive means and the second drive means to position the magnetic head to a predetermined position.

7. The magnetic head and disk tester of claim 2 wherein the second drive means includes two vertically offset piezoelectric actuators, the movement of the two piezoelectric actuators being controlled by a controller-amplifier to control the pitch of said carriage.

8. The magnetic head and disk tester of claim 7 wherein said piezoelectric actuators eliminate pitch of said carriage by substantially eliminating the difference between the signals of said first measurement means and said second measurement means.

9. The magnetic head and disk tester of claim 8 wherein the second drive means includes two piezoelectric actuators, wherein a first of said actuators is disposed to effect horizontal positioning of the said carriage and the other of said actuators is disposed to apply a vertical force to said carriage relative to said base, to control the pitch of said carriage.

10. A magnetic head and disk tester, comprising:
    A. a base including a spindle which rotationally supports a magnetic disk about a vertical spin axis and in a substantially horizontal plane;

B. a magnetic head mounted to a carriage wherein the carriage is slidably coupled to said base such that the carriage is movable along a horizontal carriage axis;

C. a carriage driver which selectively positions said carriage along said carriage axis;

D. a carriage pitch measuring assembly, which generates a displacement error signal representative of the orientation of the magnetic head about a horizontal axis orthogonal to said carriage axis; and E. a feedback network assembly, which causes said carriage driver to adjust the position of said carriage along said carriage axis in response to said error signal, to offset pitch induced displacement of said head in the direction of said carriage axis.

11. The magnetic head and disk tester of claim 10, wherein the carriage pitch measuring assembly comprises:

A. a first pair of encoders, including a first and a second encoder, wherein the first encoder is secured to a right side of said carriage and the second encoder is secured to a left side of said carriage and disposed in a first horizontal plane, and B. a second pair of encoders, including a third and a fourth encoder, wherein the third encoder is secured to the right side of said carriage and vertically displaced below the first encoder at a distance L and the fourth encoder is secured to the left side of said carriage and vertically displaced below the second encoder at the distance L, wherein the third and fourth encoders are disposed in a second horizontal plane, vertically offset from said first horizontal plane.

12. The magnetic head and disk tester of claim 11, wherein:

A. the first encoder measures the horizontal linear displacement of the right side of the carriage in the first horizontal plane; and B. the second encoder measures the horizontal linear displacement of the left side of the carriage in the first horizontal plane.

13. The magnetic head and disk tester of claim 12, wherein:

A. the third encoder measures the horizontal linear displacement of the right side of the carriage in the second horizontal plane; and B. the fourth encoder measures the horizontal linear displacement of the left side of the carriage in the second horizontal plane.

14. The magnetic head and disk tester of claim 10, wherein the carriage driver includes a coarse driver which effects coarse positioning of the magnetic head and a fine driver which accomplishes fine positioning of the magnetic head, in the direction of said carriage axis.

15. The magnetic head and disk tester of claim 14, wherein the error signal is an electrical error signal and the fine driver positions the magnetic head in response to said electrical error signal.

16. The magnetic head and disk tester of claim 15, wherein the fine driver includes a piezoelectric actuator.

17. The magnetic head and disk tester of claim 14, wherein the fine driver includes a first and a second actuator.

18. The magnetic head and disk tester of claim 17, wherein the first and second actuator are disposed such that each of the first and second actuators is capable of independently applying a force to said carriage, and the first actuator is vertically offset from said second actuator, such that selective displacement of said carriage by either of the first and second actuator causes a change in the pitch of said carriage.

19. The magnetic head and disk tester of claim 17, wherein:

A. the first actuator is horizontally disposed to permit application of a horizontal linear force to said carriage, with respect to said base;

B. the second actuator is vertically disposed to permit application of a vertical force to said carriage with respect to said base whereby actuation of said second actuator adjusts the pitch of said carriage.

20. A method for correcting errors in the positioning of a magnetic head relative to a magnetic disk in a magnetic head and disk tester having a disk supported in a substantially horizontal plane and rotatable about a substantially vertical spin axis by a spindle supported by a base, a carriage which supports the magnetic head, wherein said carriage is movable along a horizontal carriage axis, a carriage driver which positions the carriage along the carriage axis, and a carriage pitch measuring assembly which generates a signal representative of tilt of said magnetic head caused by pitch of the carriage about a pitch axis which is orthogonal to carriage axis, the method comprising the steps of:

A. moving the magnetic head along said carriage axis by an amount which corresponds to a predetermined position plus an amount of linear displacement caused by pitch of the carriage;

B. detecting the pitch of the carriage;

C. determining the linear displacement of the head relative to the predetermined position due to the pitch of the carriage;

D. generating a linear adjustment signal which corresponds to a repositioning of the carriage which results in a corresponding repositioning of the magnetic head substantially at the predetermined position; and E. adjusting the magnetic head position in response to the linear adjustment signal.

* * * * *